US011439070B2

(12) United States Patent
Demon

(10) Patent No.: US 11,439,070 B2
(45) Date of Patent: Sep. 13, 2022

(54) AGRICULTURAL BALER WITH A TWO PART TAIL GATE ARRANGEMENT AND A DISCHARGE SEQUENCE METHOD

(71) Applicant: CNH Industrial America LLC, New Holland, PA (US)

(72) Inventor: Frederik Demon, Bruges (BE)

(73) Assignee: CNH Industrial America LLC, New Holland, PA (US)

( * ) Notice: Subject to any disclaimer, the term of this patent is extended or adjusted under 35 U.S.C. 154(b) by 353 days.

(21) Appl. No.: 15/745,130

(22) PCT Filed: Jul. 7, 2016

(86) PCT No.: PCT/EP2016/066205
§ 371 (c)(1),
(2) Date: Jan. 15, 2018

(87) PCT Pub. No.: WO2017/009196
PCT Pub. Date: Jan. 19, 2017

(65) Prior Publication Data
US 2019/0014724 A1    Jan. 17, 2019

(30) Foreign Application Priority Data
Jul. 15, 2015    (BE) .................................... 2015/5453

(51) Int. Cl.
*A01F 15/08*    (2006.01)
*A01F 15/07*    (2006.01)

(52) U.S. Cl.
CPC ........ *A01F 15/0883* (2013.01); *A01F 15/071* (2013.01); *A01F 2015/076* (2013.01)

(58) Field of Classification Search
CPC .... A01F 15/0883; A01F 15/071; A01F 15/08; A01F 100/88; A01F 100/08; A01F 100/13; A01F 15/07; A01F 2015/076
(Continued)

(56) References Cited

U.S. PATENT DOCUMENTS

| 4,499,714 A | 2/1985 | Hollmann |
| 4,841,851 A | 6/1989 | Quataert |

(Continued)

FOREIGN PATENT DOCUMENTS

| DE | 10250425 A1 * | 5/2004 | ............ A01F 15/07 |
| DE | 10250425 A1 | 5/2004 | |

(Continued)

OTHER PUBLICATIONS

PCT International Search Report for PCT application PCT/EP2016/066205, dated Sep. 13, 2016 (13 pages).

*Primary Examiner* — Jimmy T Nguyen
(74) *Attorney, Agent, or Firm* — Peter Zacharias; Patrick Sheldrake

(57) ABSTRACT

An agricultural round baler includes a frame, and a tail gate arrangement carried by the frame and arranged in an arcuate arrangement around a bale chamber. The baler is characterized in that the tail gate arrangement include an upper tail gate arrangement and a lower tail gate arrangement. The upper tail gate arrangement has a first pivot axis located at an upper, forward portion thereof. The lower tail gate arrangement has a second pivot axis located at an approximate center of the bale chamber when viewed in cross section.

15 Claims, 3 Drawing Sheets

(58) Field of Classification Search
USPC .............................................. 100/88, 89, 76
See application file for complete search history.

(56) References Cited

U.S. PATENT DOCUMENTS

| | | | | |
|---|---|---|---|---|
| 5,159,876 A | * | 11/1992 | Olin | .................... A01F 15/0883 100/100 |
| 6,672,205 B2 | | 1/2004 | Viaud | |
| 2002/0121200 A1 | * | 9/2002 | Viaud | ................. A01F 15/0883 100/70 R |
| 2005/0045051 A1 | * | 3/2005 | Viaud | ................. A01F 15/0883 100/88 |
| 2012/0204739 A1 | * | 8/2012 | Beaufort | ................. A01F 15/08 100/88 |
| 2013/0133530 A1 | * | 5/2013 | Roberge | .............. A01F 15/0883 100/88 |
| 2014/0165856 A1 | * | 6/2014 | Varley | ................. A01F 15/0705 100/40 |
| 2015/0327442 A1 | * | 11/2015 | Gaudreault | ........... B30B 9/3082 100/3 |
| 2016/0135375 A1 | * | 5/2016 | Smith | .................... A01F 15/07 56/341 |
| 2016/0374271 A1 | * | 12/2016 | Menetrier | ............. A01F 15/085 53/167 |

FOREIGN PATENT DOCUMENTS

| | | | | |
|---|---|---|---|---|
| EP | 1230837 | A1 | * 8/2002 | ............. A01F 15/07 |
| EP | 2052598 | A1 | 4/2009 | |
| EP | 2923559 | A1 | 9/2015 | |

* cited by examiner

AGRICULTURAL BALER WITH A TWO PART TAIL GATE ARRANGEMENT AND A DISCHARGE SEQUENCE METHOD

BACKGROUND OF THE INVENTION

The present invention relates to agricultural balers, and, more particularly, to a tail gate arrangement for a round baler.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a round baler or large square baler, straddles the windrows and travels along the windrows to pick up the crop material and form it into bales.

A round baler may include a main bale chamber where the crop material is rolled into a bale of a predetermined size, and then typically wrapped with twine or mesh. The main bale chamber is typically configured as an expandable chamber, with a plurality of carrier elements positioned around at least a portion of the periphery of the bale chamber. The carrier elements can be in the form of rollers, chains and slats and/or belts. The rear of the baler is configured to open and allow the bale to be discharged from the rear of the baler, and the discharge operation accounts for down time of the baler and thereby reduces the overall efficiency of the baler. Typically some type of tail gate at the rear of the baler opens to allow the bale to be discharged.

What is needed in the art is an agricultural baler with a tail gate which is configured to allow an easy and efficient discharge of the bale from the baler.

SUMMARY OF THE INVENTION

The present invention provides a two part tail gate with an upper tail gate arrangement which pivots at its top, front, and a lower tail gate arrangement which pivots at an approximate center of the bale chamber. Configured in this manner, the lower tail gate arrangement quickly ejects the bale from the bale chamber.

The invention in one form is directed to an agricultural baler, including a frame, and a tail gate arrangement carried by the frame and arranged in an arcuate arrangement around a bale chamber. The baler is characterized in that the tail gate arrangement include an upper tail gate arrangement and a lower tail gate arrangement. The upper tail gate arrangement has a first pivot axis located at an upper, forward portion thereof. The lower tail gate arrangement has a second pivot axis located at an approximate center of the bale chamber when viewed in cross section.

The agricultural baler can include an electrical processing circuit which is configured for carrying out a bale discharge operation using the upper tail gate arrangement and the lower tail gate arrangement, based on the following discharge sequence: 1) sensing a full bale condition within the bale chamber, corresponding to a predetermined size of the bale; 2) opening the upper tail gate arrangement by pivoting the upper tail gate arrangement about the first pivot axis to an open position; and 3) ejecting the bale by pivoting the lower tail gate arrangement about the second pivot axis to an eject position.

The ejecting step can further begin when the opening step is partially completed.

The discharge sequence can further include the step of wrapping the bale with a wrapping material, after the sensing step and prior to the opening step.

The invention in another form is directed to a method for operating the discharge sequence for the agricultural baler.

An advantage of the present invention is that the bale is quickly ejected from the bale chamber.

Another advantage is that the overall efficiency of the baler is increased by reducing the down time associated with bale ejection from the baler.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1A:
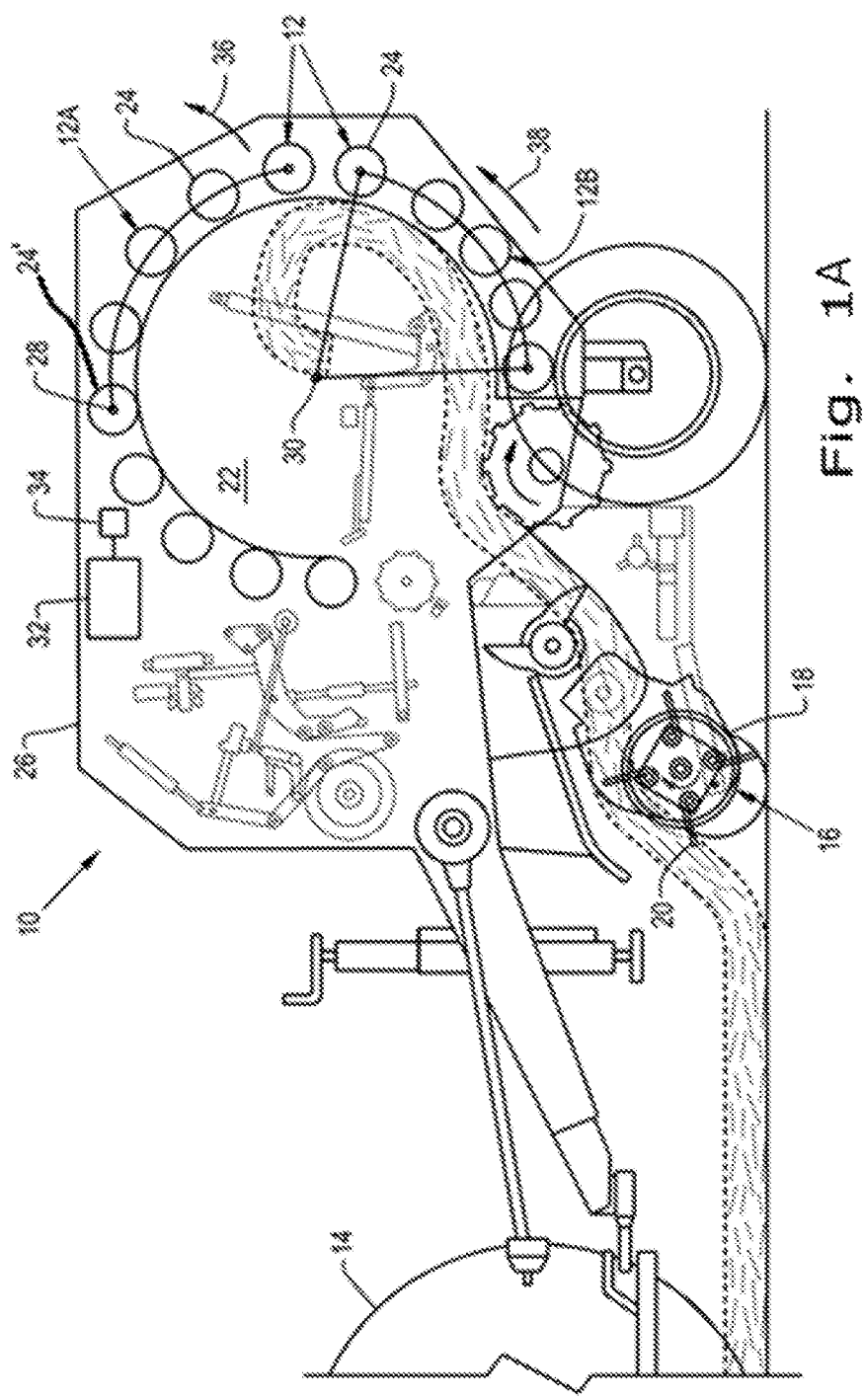
FIG. 1A is a side sectional view of a round baler, including an embodiment of a tail gate arrangement of the present invention in its closed position.

Referring now to the drawings, and more particularly to FIG. 1A, there is shown a side sectional view with the internal workings of a round baler 10, including an embodiment of a tail gate arrangement 12 of the present invention. In the illustrated embodiment, the baler 10 is towed by a prime mover, such as a tractor 14. However, the baler 10 can also be a self-propelled baler for certain applications.

Crop material is lifted from windrows into the baler 10 using a pickup unit 16. The pickup unit 16 includes a rotating pickup roll 18 with tines 20 which move the crop rearward toward a bale chamber 22. In general, the crop material is rolled into a bale of a predetermined size within the bale chamber 22, and then discharged through the tail gate arrangement 12 to the field where it is subsequently picked up for transport.

The bale chamber 22 is configured as an expandable bale chamber with a plurality of carrier elements 24 carried by a frame 26. The carrier elements 24 are arranged in an arcuate arrangement around the bale chamber 22, and function to engage and roll the expanding hay bale as the crop material is fed into the bale chamber 22. In the illustrated embodiment, the plurality of carrier elements 24 are configured as a plurality of rollers. However, the carrier elements can be variously formed, such as rollers, chains and slats, and/or belts.

According to an aspect of the present invention, the plurality of carrier elements 24 include an upper tail gate arrangement 12A and a lower tail gate arrangement 12B. The upper tail gate arrangement 12A includes a plurality of the carrier elements (i.e., rollers), and has a first pivot axis 28 located at an upper, forward portion thereof. In particular, the first pivot axis 28 is located at the axis of rotation of the upper, forward roller 24'. With the first pivot axis 28 at this location, the upper tail gate arrangement 12A opens in a clam shell type manner.

Figure 1B:
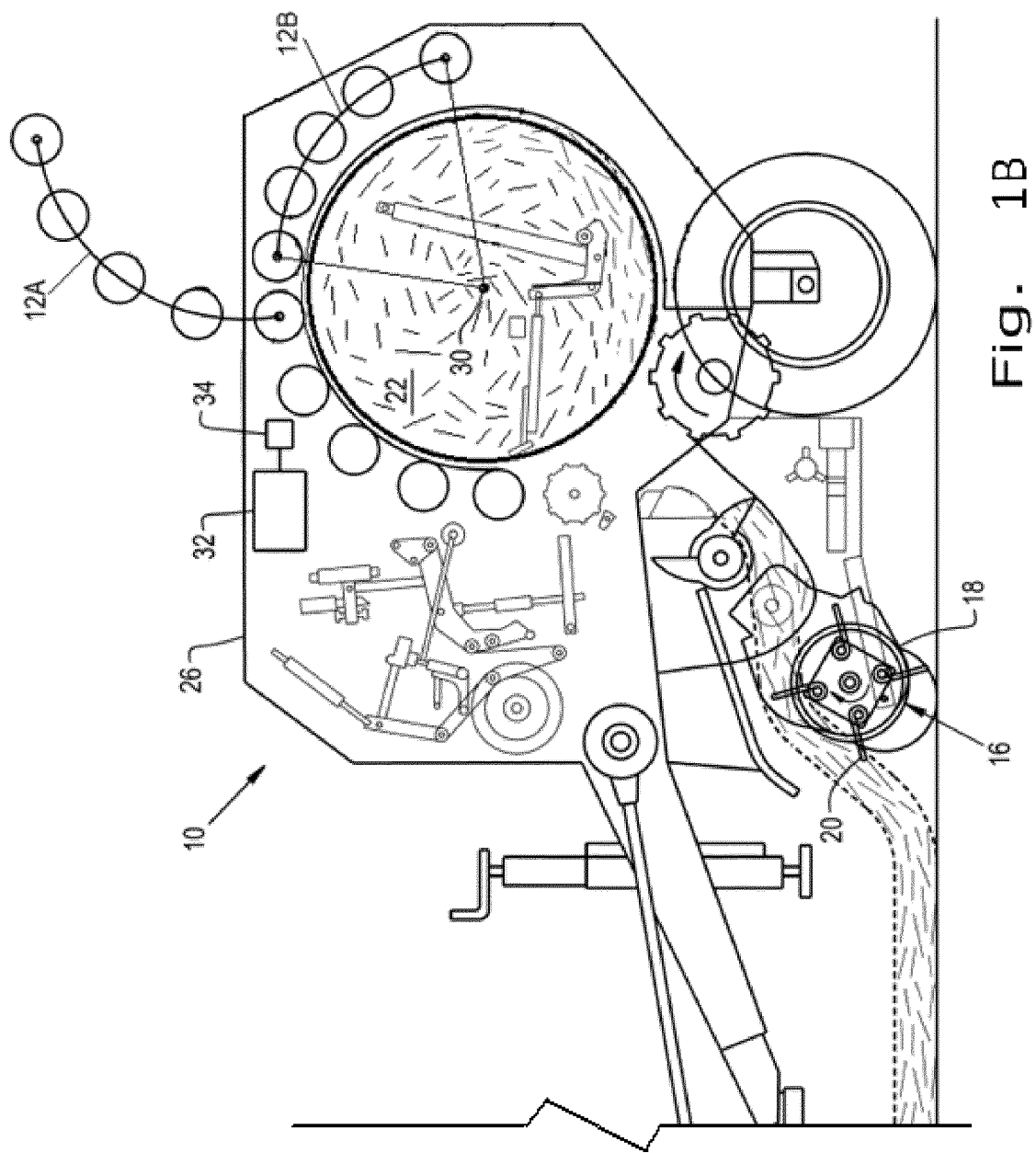
FIG. 1B is a side sectional view of the round baler of FIG. 1A, including the embodiment of the tail gate arrangement of FIG. 1A in its open position.

The lower tail gate arrangement 12B also includes a plurality of the carrier elements (i.e., rollers) and has a second pivot axis 30 located at an approximate center of the bale chamber 22, when viewed in cross section. The lower tail gate arrangement 12B can pivot between a closed position (shown in FIG. 1A), and an open position (shown in FIG. 1B) allowing the bale to exit from the tail gate 12 (counter-clockwise as shown in FIG. 1A). With a pivot location 30 as shown, the lower tail gate arrangement 12B can pivot very fast (compared to known tail gate arrangements), thereby decreasing the discharge cycle time and improving the overall efficiency of the baler 10.

The agricultural baler 10 can further include an electrical processing circuit 32 which is configured for carrying out a bale discharge operation using the upper tail gate arrangement 12A and the lower tail gate arrangement 12B. The electrical processing circuit 32 can carry out the bale discharge operation, based on the following discharge sequence:

sensing a full bale condition within the bale chamber 22 using an appropriate sensor 34, corresponding to a predetermined size of the bale within the bale chamber 22;

opening the upper tail gate arrangement 12A by pivoting the upper tail gate arrangement about the first pivot axis 28 to an open position (in an upward direction, as shown by directional arrow 36 in FIG. 1A); and ejecting the bale by pivoting the lower tail gate arrangement 12B about the second pivot axis 30 to an eject position (counter-clockwise in an upward direction, as shown by directional arrow 38 in FIG. 1A).

Of course, it will be appreciated that the electrical processing circuit 32 is coupled with suitable actuators (not shown), which are in turn coupled with the upper tail gate arrangement 12A and the lower tail gate arrangement 12B, for pivoting the upper tail gate arrangement 12A and the lower tail gate arrangement 12B about the respective pivot axes 28 and 30.

In a preferred embodiment of the discharge sequence, the step of ejecting the bale by pivoting the lower tail gate arrangement 12B about the second pivot axis 30 to an eject position may start before the step of opening the upper tail gate arrangement 12A is completed. Once the upper tail gate arrangement 12A has moved a sufficient distance away from its closed position, the lower tail gate arrangement 12B may start to open, such that the fully open position of the upper tail gate arrangement 12A and the fully open position of the lower tail gate arrangement 12B is reached simultaneously or almost simultaneously. A sensor (not shown), connected to the electrical processing circuit 32, may be used to detect when the upper tail gate arrangement 12A has reached the position on which the lower tail gate arrangement 12B may start to move, such that collision between the upper tail gate arrangement 12A and the lower tail gate arrangement 12B is prevented. The signal from the sensor for detecting the position of the upper tail gate arrangement 12A is thus used by the electrical processing circuit 32 as an input signal and taken into account during the execution of the discharge sequence.

The discharge sequence can further include the step of wrapping the bale with a wrapping material, after the full bale condition is sensed and prior to opening the upper tail gate arrangement 12A. To further decrease the bale discharge time, the upper tail gate arrangement 12A can be opened when the wrapping step is partially completed. In particular, the upper tail gate arrangement 12A can be opened when the bale has been wrapped with at least one full revolution of wrapping material (e.g., mesh or twine).

Figure 2:
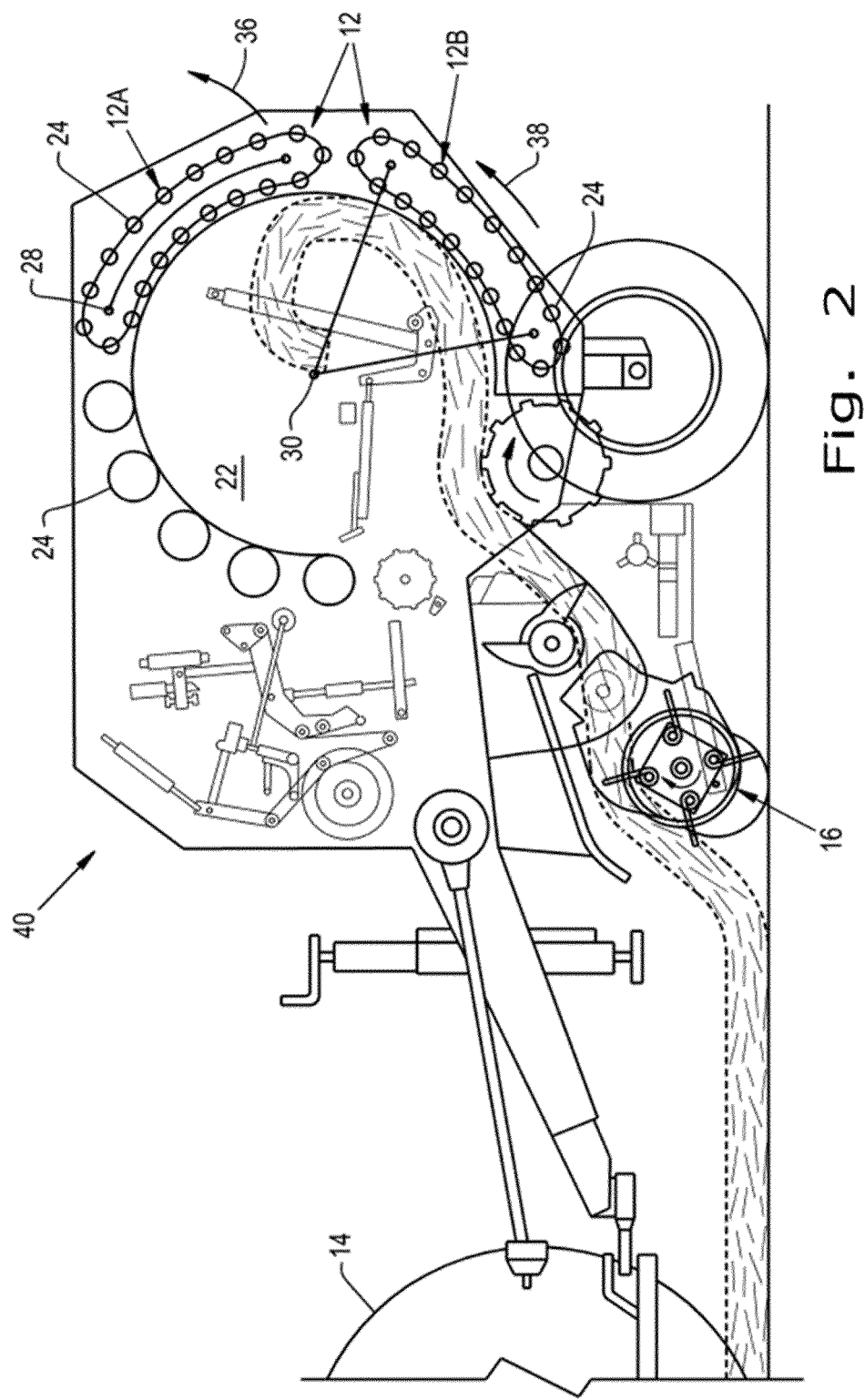
FIG. 2 is a side sectional view of a round baler, including another embodiment of a tail gate arrangement of the present invention.

FIG. 2 shows an embodiment of a baler 40 which is similar to the baler 10 shown in FIG. 1. The primary difference is that the carrier elements 24 forming the upper tail gate arrangement 12A and the lower tail gate arrangement 12B are configured as chains and slats, rather than rollers. The upper tail gate arrangement 12A still has a first pivot axis 28 located at an upper, forward portion thereof, and the lower tail gate arrangement 12B still has a second pivot axis 30 located at an approximate center of the bale chamber 22, when viewed in cross section.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural round baler, comprising:
    a frame; and
    a tail gate arrangement carried by the frame and arranged in an arcuate arrangement around a bale chamber,
    wherein the tail gate arrangement includes an upper tail gate arrangement and a lower tail gate arrangement positioned below the upper tail gate arrangement, each of the upper and lower tail gate arrangements having a plurality of carrier elements arranged in an arcuate arrangement around at least a portion of a periphery of the bale chamber for rolling an expanding bale, the upper tail gate arrangement having a first pivot axis located at an upper, forward portion thereof, the first pivot axis located above the bale chamber, the lower tail gate arrangement having a second pivot axis located at an approximate center of the bale chamber when viewed in cross section of the baler, the upper tail gate arrangement having an open position achieved by pivoting the upper tail gate arrangement in an upward direction about the first pivot axis to the open position, the lower tail gate arrangement having an eject position achieved by pivoting the lower tail gate arrangement in an upward direction about the second pivot axis to the eject position to eject a completed bale from the baling chamber, and wherein when the lower and upper tail gate arrangements are in an upper position, the arcuate arrangement of the carrier elements of the lower tailgate arrangement is positioned at least partially under the arcuate arrangement of the carrier elements of the upper tailgate arrangement when viewed in cross section of the baler.

2. The agricultural baler of claim 1, further comprising an electrical processing circuit which is configured for carrying out a discharge operation for a bale using the upper tail gate arrangement and the lower tail gate arrangement, based on the following discharge sequence of steps:

sensing a full bale condition within the bale chamber, corresponding to a predetermined size of the bale;

opening the upper tail gate arrangement by pivoting the upper tail gate arrangement about the first pivot axis to the open position; and ejecting the bale by pivoting the lower tail gate arrangement about the second pivot axis to the eject position.

3. The agricultural baler of claim 2, wherein the ejecting step begins when the opening step is partially completed.

4. The agricultural baler of claim 3, further comprising a sensor for sensing when the opening step is partially completed.

5. The agricultural baler of claim 2, wherein the discharge sequence of steps further includes: wrapping the bale with a wrapping material, after the sensing step and prior to the opening step.

6. The agricultural baler of claim 5, wherein the opening step begins when the wrapping step is partially completed.

7. The agricultural baler of claim 6, wherein the opening step begins when the wrapping step has completed at least one full revolution of wrapping.

8. The agricultural baler of claim 1, wherein the carrier elements comprise a plurality of rollers, and the upper tail gate arrangement has an upper, forward roller defining the first pivot axis.

9. The agricultural baler of claim 1, wherein the carrier elements comprise a plurality of rollers, or chains and slats, or belts.

10. The agricultural baler of claim 2, wherein the agricultural round baler further comprises a sensor for sensing the full bale condition within the bale chamber.

11. A method for operating a discharge sequence for an agricultural round baler comprising a frame and a tail gate arrangement carried by the frame and arranged in an arcuate arrangement around a bale chamber, the tail gate arrangement include an upper tail gate arrangement and a lower tail gate arrangement positioned below the upper tail gate arrangement, each of the upper and lower tail gate arrangements having a plurality of carrier elements arranged in an arcuate arrangement around at least a portion of a periphery of the bale chamber for rolling an expanding bale, the upper tail gate arrangement having a first pivot axis located at an upper, forward portion thereof, the first pivot axis located above the bale chamber, the lower tail gate arrangement having a second pivot axis located at an approximate center of the bale chamber when viewed in cross section of the baler, the method comprising the sequential steps of:

sensing a full bale condition within the bale chamber, corresponding to a predetermined size of the bale;

opening the upper tail gate arrangement by pivoting the upper tail gate arrangement in an upward direction about the first pivot axis to an open position; and ejecting the bale by pivoting the lower tail gate arrangement in an upward direction about the second pivot axis to an eject position to eject a completed bale from the baling chamber, wherein when the lower and upper tail gate arrangements are in an upper position, the arcuate arrangement of the carrier elements of the lower tailgate arrangement is positioned at least partially under the arcuate arrangement of the carrier elements of the upper tailgate arrangement when viewed in cross section of the baler.

12. The method of claim 11, wherein the ejecting step begins when the opening step is partially completed.

13. The method of claim 11, further comprising the step of wrapping the bale with a wrapping material, after the sensing step and prior to the opening step.

14. The method of claim 13, wherein the opening step begins when the wrapping step is partially completed.

15. The method of claim 14, wherein the opening step begins when the wrapping step has completed at least one full revolution of wrapping.

\* \* \* \* \*